United States Patent [19]

Brandenstein et al.

[11] Patent Number: 4,618,335
[45] Date of Patent: Oct. 21, 1986

[54] TENSION-ADJUSTING DEVICE FOR DRIVING BELT

[75] Inventors: Manfred Brandenstein, Eussenheim; Roland Haas, Hofheim; Gerhard Herrmann, Schweinfurt; Wolfgang Friedrich, Schweinfurt; Ludwig Edelmann, Schweinfurt, all of Fed. Rep. of Germany

[73] Assignee: SKF Kugellagerfabriken GmbH, Schweinfurt, Fed. Rep. of Germany

[21] Appl. No.: 660,968

[22] Filed: Oct. 15, 1984

[30] Foreign Application Priority Data

Oct. 26, 1983 [DE] Fed. Rep. of Germany ... 8330695[U]

[51] Int. Cl.⁴ .......................... F16H 7/08; F16H 7/10
[52] U.S. Cl. ..................................... 474/112; 474/133
[58] Field of Search .............................. 474/112, 133

[56] References Cited

U.S. PATENT DOCUMENTS

| | | | |
|---|---|---|---|
| 1,348,023 | 7/1920 | McAvoy | 474/112 |
| 2,196,255 | 4/1940 | Dow | 474/112 |
| 2,774,638 | 12/1956 | Spanjer | 474/112 |
| 3,829,176 | 8/1974 | Miokovic | 474/112 |
| 4,504,252 | 3/1985 | Honma | 474/112 |

FOREIGN PATENT DOCUMENTS 3043287 6/1981 Fed. Rep. of Germany ...... 474/112

*Primary Examiner*—Donald Watkins
*Attorney, Agent, or Firm*—Rosen, Dainow & Jacobs

[57] ABSTRACT

A tension-adjusting device for a driving belt comprising a tension roller and having an engagement arrangement provided between a support of the tension roller and a machine frame for enabling stepwise swiveling movement about a partially disengaged mounting bolt. The axis of swivel is radially displaced from the rolling axis of the tension roller. The engagement arrangement comprises a projection formed on the support radially displaced from the axis of swivel and a plurality of depressions formed in the machine frame and arranged at regular intervals along an arc defined by the path of travel of the projection during swiveling, whereby the projection is engageable with each depression, thereby defining a corresponding step in a range of adjustment of the tension of the driving belt.

6 Claims, 2 Drawing Figures

TENSION-ADJUSTING DEVICE FOR DRIVING BELT

FIELD OF THE INVENTION

The invention relates to a tension-adjusting device for a driving belt with a tension roller, having a swivel point displaced from the rolling axis, the swivel position of the tension-adjusting device being adjustable.

BACKGROUND OF THE INVENTION

A tension-adjusting device of the above-described type is disclosed in DE-GM No. 8120032, in which a rolling surface rotates on a support by means of a ball bearing. The support is essentially cup-shaped and has an eccentric bore offset from the axis of rotation. The tension-adjusting device swivels and is fastened to a machine frame by means of a mounting bolt. To effect swiveling, working surfaces for an adjusting tool are provided.

Another tension-adjusting device is disclosed in DE-GM No. 8133386, in which a tension roller is fastened to a carrier plate. The swivel point lies outside the tension roller, whereby a greater range of adjustment is achieved. The tension-adjusting device is fastened to a machine frame by a mounting bolt which is also arranged outside of the tension roller.

Both of the above-described prior art devices have the disadvantage that after loosening of the mounting bolt, the tension roller is left to be easily and freely movable throughout its range of adjustment. In particular, in the case of a tension roller employed with a stretched driving belt, the tension roller automatically swivels back immediately upon loosening of the mounting bolt as a result of the tension of the driving belt. When in the case of the known tension-adjusting devices, for example, a slight adjustment is necessary, the swiveling movement must be carefully carried out with two hands and two tools, namely an adjusting tool for swiveling the tension roller and a spanner for simultaneously tightening the mounting bolt. The same applies when measuring instruments are used to determine the tension of the driving belt.

SUMMARY OF THE INVENTION

The object of the invention is to provide a tension-adjusting device that improves upon the prior art devices, so that the adjustment and fixation can be carried out with one hand.

The above object is achieved by providing an engagement arrangement between a support, i.e., a carrier plate, and a machine frame whereby stepwise swiveling movement is possible.

In the case of partial unscrewing of the mounting bolt, the engagement arrangement according to the invention causes the tension-adjusting device to stay in the respective engagement position despite the counteracting force of the tensioned belt. The tension-adjusting device can be moved in the swiveling direction only by means of the application of additional force. In this way a swiveling movement, for example, can take place encompassing one or more steps between a series of engagement positions, after which the mounting bolt is tightened, without requiring the tension-adjusting device to be held fast in the swivel position. The engagement arrangement according to the invention makes it possible to accomplish the adjustment and holding of the tension-adjusting device one after the other without, during partial unscrewing of the bolt, making it necessary to stop in the respective position. This provides the advantage that only a single hand is necessary for adjustment and holding, which frequently renders the working conditions considerably easier.

A further feature of the invention is that the engagement arrangement comprises a projection located on the tension-adjusting device at a point radially displaced from the swivel point and a series of depressions formed in the machine frame along an arc defined by the swivel pitch circle. The depressions are formed and located so as to cooperate with the projection during swiveling of the tension adjusting device. Each depression serves as a step in the range of adjustment. The projection can, for example, be provided on a carrier plate or, in the case of a tension roller without a carrier plate, on a support. Cooperating pocket-shaped drill holes of small depth are provided in the machine frame. However, it is also possible to produce these depressions by stamping. This inventive embodiment is advantageous if an engagement arrangement is to be provided for on the machine frame later. The distances of the depressions from each other and from the swivel point determine the step angle between successive engagements of the projection and depressions during swiveling movement.

According to another preferred embodiment of the invention, the projection is provided on the machine frame and the depressions are arranged on the support. This converse arrangement can be used if the projection on the machine frame is produced, for example, by a casting technique. Thus, the plurality of depressions can be simply formed on the tension roller, for example, in the case of parts shaped from sheet metal, by simultaneously molding the depressions.

According to a further embodiment of the invention, the projection is stamped on an axially resilient sheet metal lug which is affixed to the support of the tension roller. The sheet metal lug can be manufactured to have a correspondingly long spatial relationship, so that, particularly in the case of a tension roller with the swivel point lying inside the support, a step angle sufficiently small to enable fine adjustment of the tension is possible. The resilient construction of the sheet metal lug enhances the engaging capacity and the stepwise adjustment.

A further feature of the invention is that the tension-adjusting device has a tension spring which acts on the tension roller to resist the force of the tensioned driving belt. Thus, a particularly fine adjustment with little expenditure of energy is possible in the direction of tensioning as well as relaxation.

BRIEF DESCRIPTION OF THE DRAWINGS

The preferred embodiment of the invention is described in detail with reference to the following drawings, wherein.

DETAILED DESCRIPTION OF THE PREFERRED EMBODIMENT

Figure 1:
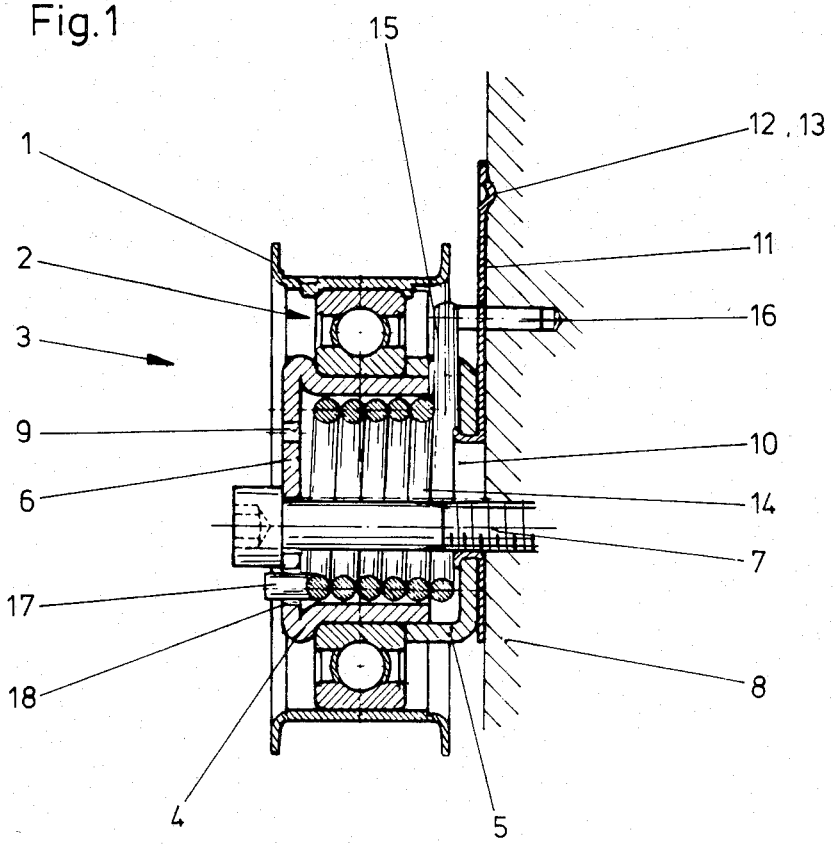
FIG. 1 is a sectional view of a tension-adjusting device with support, tension spring, and adjusting arrangement including sheet metal lug.
Figure 2:
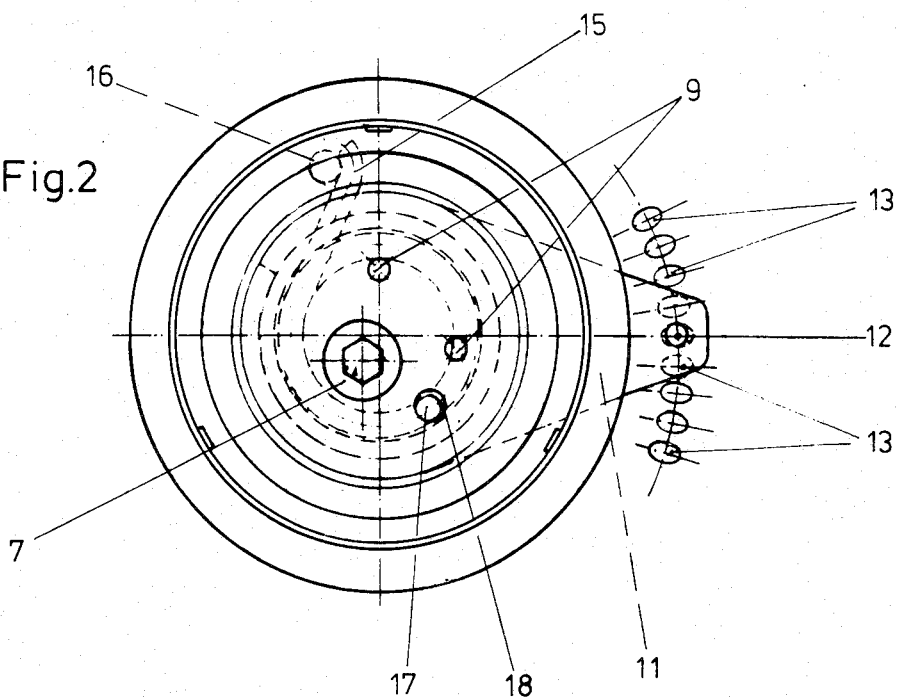
FIG. 2 is a side view of the tension-adjusting device depicted in FIG. 1.

The tension-adjusting device shown in FIG. 1 essentially comprises a rolling surface 1 affixed to the outer ring of a ball bearing 2 and a support 3. The support 3 is constructed with two cup-shaped parts 4, 5 made of sheet metal, which serve to axially fix the ball bearing 2 by opposing preloading forces applied on the side surfaces of the bearing inner ring. The base 6 of cup-shaped part 4 is for that purpose provided with a toroidal radial base. A mounting bolt 7 is inserted in an eccentrically arranged bore in base 6, by means of which the support body 3 is affixed to a machine frame 8 and which at the same time serves as the swivel point for the tension-adjusting device. Furthermore, two bores 9 are provided in the base 6, which bores serve as the points at which an adjusting tool (not shown) is applied for adjustment of the position of the tension-adjusting device. The cup-shaped part 5 arranged proximate to the machine frame 8 has a central relatively large bore 10, in which the rolled-in flange of a sheet metal lug 11 is fixedly inserted. The lug 11 extends radially outward, parallel to and abutting the machine frame, by means of which twisting of the tension-adjusting device under torsion is resisted. A crater-shaped projection 12 is impressed on the outer periphery of sheet metal lug 11, which projection resiliently engages one of a series of depressions 13 in the machine frame 8. The depressions are arranged along an arc (as shown in FIG. 2) defined by the path of travel of the projection 12 during swiveling of the tension-adjusting device. The depressions 13 are arranged in close proximity to each other, in order to assure fine adjustment of the tension in the driving belt. A tension spring 14 is arranged in the interior of the support 3, one end 15 of which extends radially through a guideway formed in the sleeve-shaped portion of the cup-shaped part 5 and is braced against a bolt 16 embedded in the machine frame. The guideway is slot-shaped and extends circumferentially along the sleeve-shaped portion. This guideway allows the resilient swinging motion of the tension-adjusting device. The other end 17 of the tension spring is directed at an angle and is braced in a bore 18 formed in the base 6 of the other cup-shaped part 4.

When the tension-adjusting device is to be adjusted, the mounting bolt is unscrewed a small amount, so that the frictional fixation of the lug 11 is removed, yet no axial play of the supporting body 3 on the mounting bolt 7 is created. The adjusting arrangement with the projection 12 on the sheet metal lug 11 and the corresponding depression 13 in the machine frame 8 holds the tension-adjusting device in the first swivel position. The tension spring 14, which counteracts the tension of the driving belt (not shown), nearly creates an equilibrium of forces, so that the engagement arrangement 12, 13, experiences only small circumferential forces. When the tension of the driving belt is to be increased or decreased, the tension-adjusting device is swiveled about the mounting bolt by inserting an adjusting tool in the corresponding bores 9 formed in the base 6 of cup-shaped part 4. After executing this swiveling motion, the projection 12 is brought into engagement with, for example, the next depression 13, in the arc-shaped sequence of depressions, after which the engagement arrangement 12, 13 holds the stretching device in the new position. Thereafter, the mounting bolt 7 is again tightened.

The foregoing description of the preferred embodiment is presented for illustrative purposes only and is not intended to limit the scope of the invention as recited in the appended claims. Modifications may be readily effected by one having ordinary skill in the art without departing from the spirit and scope of the inventive concept herein disclosed.

What is claimed is:

1. In a tension-adjusting device for a driving belt having an axis of swivel and comprising a tension roller securely mounted on a machine by means of a tightened mounting bolt, said tension roller having a support, said axis of swivel being radially displaced from the rolling axis of said tension roller, the improvement comprising an engagement arrangement fastened to said support for coupling said support and said machine frame, said engagement arrangement enabling stepwise swiveling movement of said tension-adjusting device relative to said machine frame when said mounting bolt is slightly loosened and comprising resilient means adapted to flex in a direction substantially parallel to said axis of swivel, said resilient means having means for form-locking with any one of a plurality of receiving means formed at predetermined swivel positions on said machine frame.

2. The tension-adjusting device as defined in claim 1, wherein said form-locking means comprises a projection formed on said resilient means at a point radially displaced from said axis of swivel, and said receiving means comprises a plurality of depressions formed on said machine frame and arranged at regular intervals along an arc defined by the path of travel of said projection during swiveling of said tension-adjusting device, whereby said projection is selectively engageable with each of said depressions, thereby defining a corresponding step in a range of adjustment.

3. The tension-adjusting device as defined in claim 2, wherein said resilient means comprises a plate-like arm which extends in a radial plane in the unflexed condition of said resilient means, said projection being formed on said arm.

4. The tension-adjusting device as defined in claim 3, wherein said arm comprises a sheet metal lug.

5. The tension-adjusting device as defined in claim 1, wherein said tension-adjusting device further comprises a tension spring connected to said tension roller for counteracting the tension exerted by a driving belt arranged on said tension roller.

6. The tension-adjusting device as defined in claim 1, wherein said axis of swivel is defined by the longitudinal axis of said mounting bolt by means of which said tension-adjusting device is affixed to said machine frame.

* * * * *